United States Patent [19]
Li

[11] Patent Number: 5,706,377
[45] Date of Patent: Jan. 6, 1998

[54] WAVELENGTH ROUTING DEVICE HAVING WIDE AND FLAT PASSBANDS

[75] Inventor: Yuan P. Li, Duluth, Ga.

[73] Assignee: Lucent Technologies Inc., Murray Hill, N.J.

[21] Appl. No.: 682,453

[22] Filed: Jul. 17, 1996

[51] Int. Cl.⁶ ........................... G02B 6/26
[52] U.S. Cl. ................. 385/37; 385/24; 385/46; 385/14
[58] Field of Search ................. 385/37, 24, 46, 385/45, 14

[56] References Cited

U.S. PATENT DOCUMENTS

| | | | |
|---|---|---|---|
| 4,904,042 | 2/1990 | Dragone | 350/96.16 |
| 5,002,350 | 3/1991 | Dragone | 350/96.15 |
| 5,136,671 | 8/1992 | Dragone | 385/46 |
| 5,339,157 | 8/1994 | Glance et al. | 385/24 |
| 5,412,744 | 5/1995 | Dragone | 385/24 |
| 5,488,680 | 1/1996 | Dragone | 385/24 |

OTHER PUBLICATIONS

Takahashi, et al., "Arrayed-Waveguide Grating For Wavelength Division Multi/DeMultiplexer With Nanometere Resolution," *Electronics Letters*, 1990, vol. 26, No. 2, 87–88.

Primary Examiner—John Ngo
Attorney, Agent, or Firm—Michael A. Morra

[57] ABSTRACT

A wavelength routing device 500 includes a pair of dielectric slabs 10, 20 that are interconnected by an optical grating 30. The first dielectric slab 10 includes input ports for receiving optical signals that are routed to output ports of the second dielectric slab 20 according to their wavelengths. Y-branch splitters 70-1 are connected to the first dielectric slab. Splitters 70-1 each include a pair of adjacent waveguides, having widths ($w_1$), that are separated from each other by a center-to-center distance ($c_1$). Y-branch splitter 70-2 is connected to the second dielectric slab. Splitter 70-2 includes a pair of adjacent waveguides, having widths ($w_2$), that are separated from each other by a center-to-center distance ($c_2$). Preferably, $4w_2 > w_1 > 1.5w_2$, and $4c_2 > c_1 > 1.5c_2$. Associated with this routing device is a figure-of-merit ($B_1/B_2$) that exceeds 0.5, which represents a substantial improvement over prior art designs. Such devices 500 are particularly useful in applications where they need to be cascaded.

17 Claims, 5 Drawing Sheets

WAVELENGTH ROUTING DEVICE HAVING WIDE AND FLAT PASSBANDS

TECHNICAL FIELD

This invention relates to an optical interconnection apparatus which is capable of multiplexing and demultiplexing functions. More particularly, this invention relates to an optical interconnection apparatus having wide and flat passbands.

BACKGROUND OF THE INVENTION

In view of the substantial growth in optical communications, and the expectation of even greater growth in the near future as optical fiber networks extend to the home, it has become a matter of great importance to transmit more and more individual channels over the same fiber, and to be able to separate individual channels from each other without interference to/from the other channels. In wavelength division multiplexing (WDM) systems, each channel operates at a different wavelength (color). And even though modulation of a single wavelength signal widens its spectrum, it still does not extend very far from its central wavelength. Separating closely spaced channels from each other is accomplished by one or more bandpass filters whose characteristics are such that one particular band of wavelengths passes through the filter unchanged, while all other wavelengths are blocked or substantially attenuated.

Optical multiplexing and demultiplexing have been accomplished in the past via a pair of star couplers that are interconnected by an optical grating (i.e., a number of parallel waveguides—each differing in length with respect to its nearest neighbor by a predetermined fixed amount). Examples of such interconnected star couplers, known as Dense Wave Division Multiplexers (DWDMs), are shown in U.S. Pat. Nos. 5,002,350 and 5,136,671 and 5,412,744.

In one direction of optical transmission, the DWDM can be used as a multiplexer wherein a plurality of separate and distinct wavelengths $(\lambda_1, \lambda_2, \ldots \lambda_n)$ are launched into different input ports of one star coupler and emerge on a single output port of the other star coupler. In the other direction of optical transmission, the DWDM can be used as a demultiplexer wherein a plurality of different wavelengths are launched into a single port of one star coupler and emerge on multiple ports of the other star coupler according to their particular wavelengths. Changing the input wavelength causes the output port to change. Accordingly, DWDMs are often referred to wavelength routing devices, and the wavelength region (band) that is routed to/from a particular port is referred to as a channel. One desirable characteristic of the DWDM is uniform transmission of all wavelengths across the band of each channel (i.e., flat passbands). Another desirable characteristic of the DWDM is that the flat portions of adjacent passbands are as wide as possible without encroaching on each other. These desirable characteristics can be conveniently quantified into a figure-of-merit $(B_1/B_2)$ where $B_1$ is the bandwidth between the wavelengths where the channel gain has dropped by 1 dB from its maximum level, and $B_2$ is the bandwidth between the wavelengths where the channel gain has dropped by an additional 30 dB (i.e., a total of 31 dB from its maximum level). An ideal figure-of-merit, equal to 1.0, would eliminate crosstalk between adjacent channels and provide maximum channel-packing density.

The DWDM disclosed in U.S. Pat. No. 5,136,671 (the '671 patent) is a routing device in which $B_1/B_2 = 0.17$. However, because multiple routing devices are cascaded in large optical networks, the overall transmission characteristic of each particular channel is narrowed—a phenomenon that can be readily understood by recognizing that cascading these passive routing devices is equivalent to multiplying their individual transmission characteristics. For example, assuming that the transmission characteristic of a particular channel of a routing device has a magnitude of 1.0 at the center of the channel and 0.8 near its edges, then the transmission characteristic of that particular channel through two routing devices is still 1.0 at the center but is now 0.8×0.8=0.64 near its edges—a substantial narrowing.

The DWDM disclosed in U.S. Pat. No. 5,412,744 (the '744 patent) is an improved routing device, having wide and substantially flat passbands. Such flat passbands are achieved by coupling adjacent waveguides at the input or at the output, and optimizing their parameters. Nevertheless, the figure-of-merit $B_1/B_2$ for this design is only equal to 0.36, which is still unacceptable in applications where multiple routing devices are cascaded.

What is sought after and what does not appear to be disclosed in the prior art is a wavelength routing device that can be cascaded with similar routing devices without undue channel narrowing. Accordingly, it is desirable to design a wavelength routing device having a figure-of-merit $B_1/B_2$, which is substantially better than what has been achieved by any of the prior art designs.

SUMMARY OF THE INVENTION

A wavelength routing device includes a pair of dielectric slabs that are interconnected by an optical grating. The first dielectric slab includes input ports for receiving optical signals in a first wavelength region that are routed to predetermined output ports of the second dielectric slab. A 1×N power splitter is connected to the input of the first dielectric slab and a 1×M power splitter is connected to the output of the second dielectric slab. M and N are integers that are greater than 1.

In an illustrative embodiment of the invention, the power splitters comprise Y-branch splitters which have one input waveguide and two output waveguides (i.e., M=N=2). The splitters connected to the first dielectric slab include a pair of adjacent waveguides whose widths $(w_1)$ are approximately equal to each other, and whose center-to-center distance is $(c_1)$. The splitter connected to the second dielectric slab includes a pair of adjacent waveguides whose widths $(w_2)$ are approximately equal to each other, and whose center-to-center distance is $(c_2)$. In one preferred embodiment, $4w_2 > w_1 > 1.5w_2$; and $4c_2 > c_1 > 1.5c_2$. In another preferred embodiment, $$4w_1 > w_2 > 1.5w_1; \text{ and } 4c_1 > c_2 > 1.5c_1.$$

In another illustrative embodiment of the invention, the power splitters also comprise Y-branch splitters; one having one input and two output waveguides, but the other having one input and three output waveguides.

In each of the illustrative embodiments, the figure-of-merit $(B_1/B_2)$ exceeds 0.5 (a substantial improvement over prior art designs), which provides suitable performance in applications where multiple routing devices are cascaded.

BRIEF DESCRIPTION OF THE DRAWING

The invention and its mode of operation will be more clearly understood from the following detailed description when read with the appended drawing in which.

DETAILED DESCRIPTION

Figure 1:
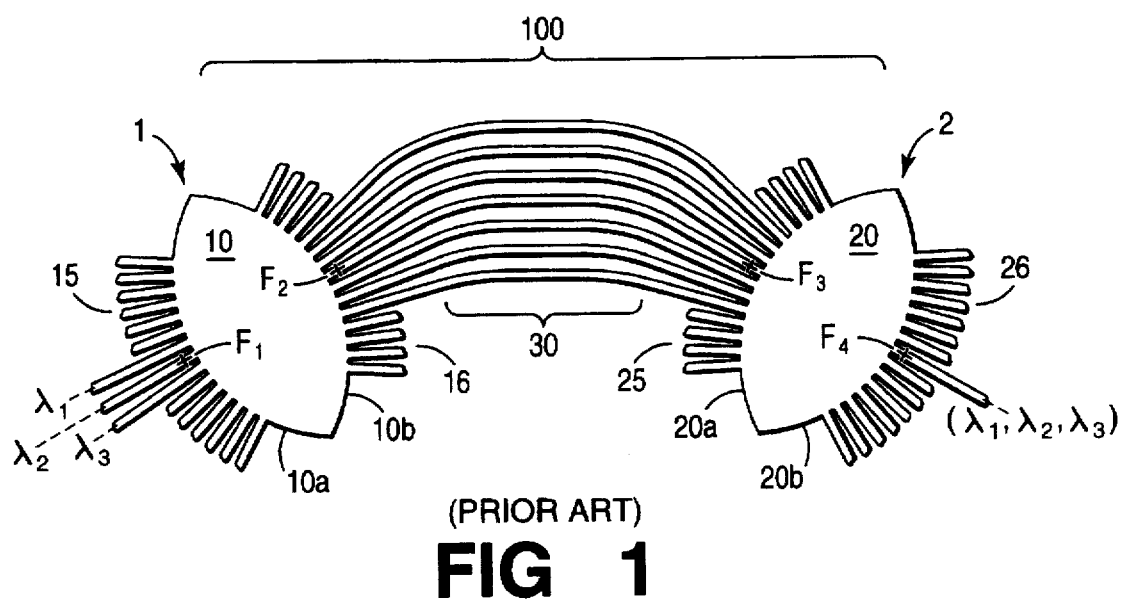
FIG. 1 is a prior art optical multiplexing and demultiplexing apparatus having single-input ports and single-output ports.

Reference is made to FIG. 1 which discloses a prior an optical multiplexer/demultiplexer 100 which is described in U.S. Pat. No. 5,136,671. Briefly, optical multiplexer/demultiplexer 100 comprises a pair of star couplers 1, 2 that are interconnected by a grating 30, which is made from a number of unequal-length optical waveguides. A star coupler splits the optical power entering any of its input ports equally among all of its output ports. Star coupler 1 comprises a dielectric slab 10 which comprises a free-space region having two curved, preferably circular, boundaries 10a and 10b. Power transfer in star coupler 1, between input array 15 and output array 16, is accomplished through radiation in the dielectric slab 10. Such star couplers are constructed using silicon optical bench technology to form dielectric slabs 10, 20 and their associated waveguide arrays 15–16, 25–26 all on a single glass substrate. Star couplers are well understood by those skilled in the art of planar optical devices. One suitable design is described in detail in U.S. Pat. No. 4,904,042.

FIG. 1 shows an array 15 of input waveguides radially directed from input ports toward a focal point F2. Each of the input waveguides is connected to the free-space region 10 in a substantially uniform fashion along boundary 10a. An array 16 of output waveguides is radially directed toward a focal point F1. Each of the waveguides in the array 16 is also connected to the free-space region 10 in a substantially uniform fashion along boundary 10b. The length of each waveguide in the grating 30 differs from the lengths of all the other waveguides in the grating so that predetermined and different phase shifts are applied to optical signals propagating through the waveguides of the grating from the star coupler 1 because of the different path lengths over which the signals in the grating must travel to reach the output of the grating. Accordingly, the optical signals emanating from each of the waveguides of grating 30 have different phases, which are functions of the lengths of the waveguides.

The waveguides of grating 30 are connected to another array 25 of waveguides which are radially directed toward a focal point F4. The array 25 connects the output of the grating 30 to the input of the second star coupler 2. Like star coupler 1, star coupler 2 comprises a slab of dielectric material 20 forming a free-space region having two curved, preferably circular, boundaries 20a and 20b. The array 25 of input waveguides is connected to the free-space region in a substantially uniform distribution along boundary 20a. An array 26 of output waveguides are radially directed from output ports toward a focal point F3. The waveguides of array 26 are also connected to the free-space region 20 in a substantially uniform distribution along the boundary 20b.

Device 100 combines individual channels, which are illustratively present on each of three waveguides of array 15, onto a single waveguide in the array 26. In this direction of transmission, multiplexing is achieved. The center frequencies of these three channels are designated $\lambda_1$, $\lambda_2$, and $\lambda_3$ in FIG. 1. For such multiplexing to occur, $\lambda_1$, $\lambda_2$, $\lambda_3$ and the various path lengths of grating 30 must be carefully selected. And since device 100 is bi-directional, demultiplexing occurs in the opposite direction. For example, if array 26 is now used as the input array, then device 100 will operate to route channels, which are all present on a single waveguide of array 26, onto different waveguides of array 15 according to their wavelengths. The transmission loss of each channel (in either direction) is shown in FIG. 2.

Figure 2:
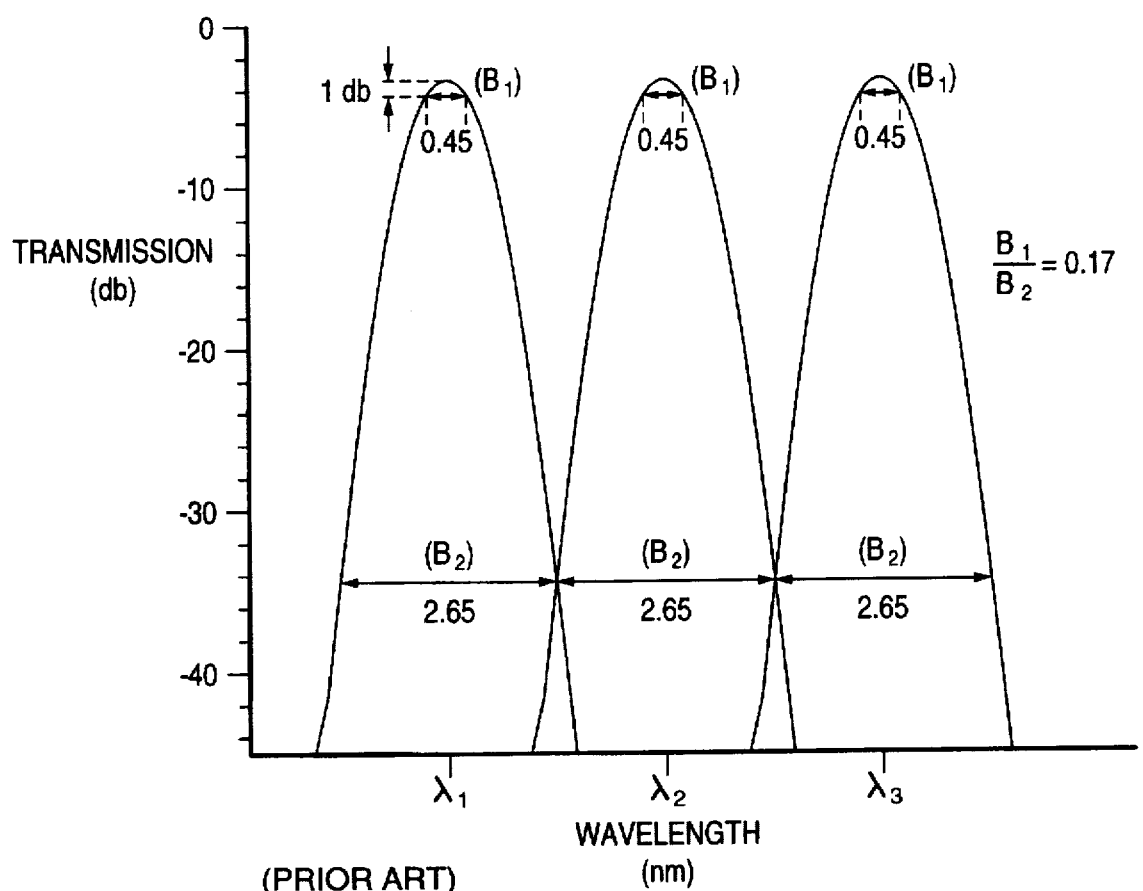
FIG. 2 shows the transmission characteristics for three adjacent channels of the multiplexing and demultiplexing apparatus disclosed in FIG. 1.

FIG. 2 discloses the transmission characteristic for multiplexer/demultiplexer 100 (shown in FIG. 1) for three adjacent channels. For the purpose of illustration, the nominal wavelength of the center channel $\lambda_2$ is about 1550 nanometers (where 1 nanometer=1 nm=a billionth of a meter). It is noted that the intrinsic loss of device 100 is about 2 decibels (dB) which means that all wavelengths suffer a loss of at least 2 dB as they traverse the device in either direction. Furthermore, the wavelengths within any particular channel suffer additional loss the further they depart from the center of the channel. As discussed earlier, it is this additional loss which the present invention seeks to control. In particular, it is desirable to have a constant gain across the entire channel, and for the transmission characteristic of each channel to decrease very sharply at its edges so that signal energy from one channel will not spread into adjacent channels, and so that the signals within each channel are not distorted by variations in the transmission characteristic of the channel. As discussed above, these desirable characteristics can be conveniently quantified into a figure-of-merit ($B_1/B_2$) where $B_1$ is the bandwidth between the wavelengths where the channel gain has dropped by 1 dB from its maximum level, and $B_2$ is the bandwidth between the wavelengths where the channel gain has dropped by an additional 30 dB. For the multiplexer/demultiplexer 100 shown in FIG. 1, $B_1/B_2=0.17$. The spacing between adjacent channels is illustratively $B_2$, which is about 2.65 nm for the design shown in FIG. 1.

Figure 3:
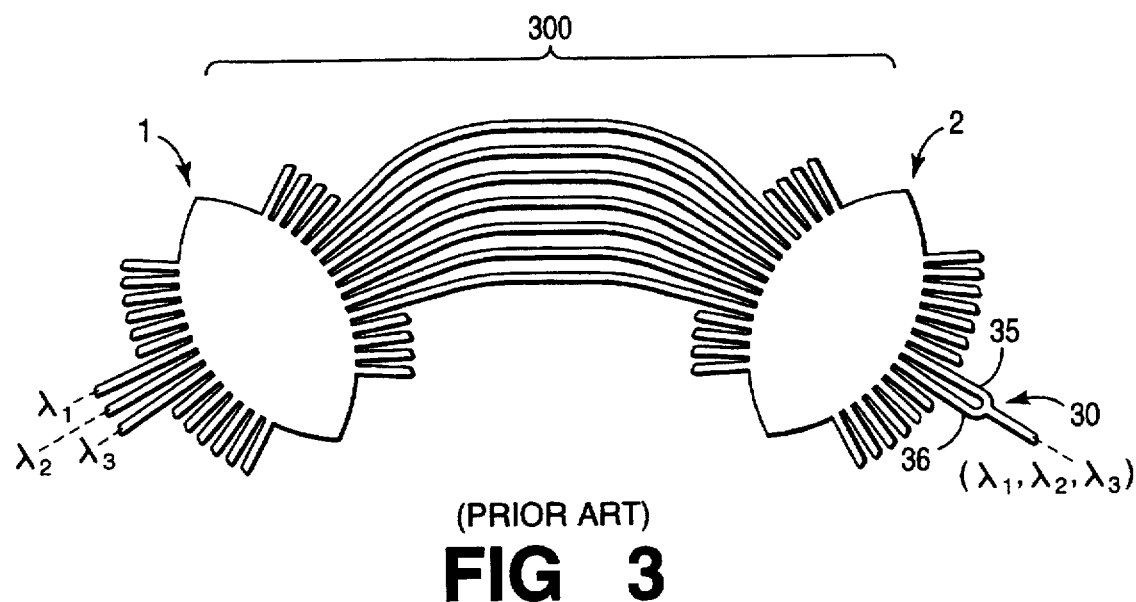
FIG. 3 is a prior an optical multiplexing and demultiplexing apparatus having single input ports and a Y-branch output port.
Figure 4:
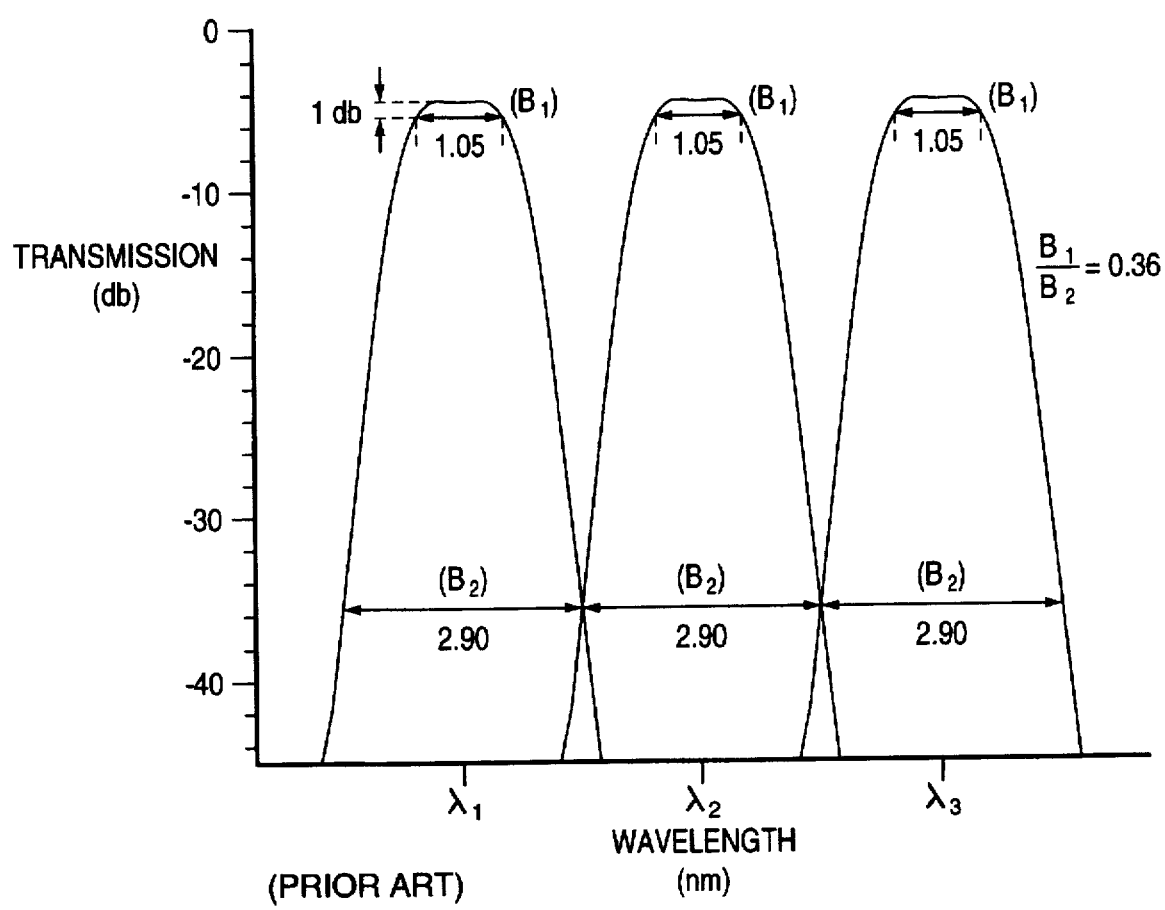
FIG. 4 shows the transmission characteristics for several adjacent channels of the multiplexing and demultiplexing apparatus disclosed in FIG. 3.

FIG. 3 discloses an optical multiplexer/demultiplexer 300 of the type shown and described in the '744 patent. It is similar to optical multiplexer/demultiplexer 100, shown in FIG. 1, with the exception that it includes a Y-branch splitter 30 connected to the ends of a pair of adjacent waveguides 35, 36 associated with star coupler 2. (It is noted that a Y-branch splitter represents a special case of a 1×N power splitter where N=2.) In multiplexer/demultiplexer 300, each channel has an intrinsic loss of about 5 dB. And while such a loss is undesirable, the associated figure of merit ($B_1/B_2$) is now equal to 0.36 as indicated in FIG. 4, and this represents a substantial improvement over the design shown in FIG. 1. Nevertheless, it is noted that the '744 patent has as its object a routing device having wide passbands with minimal loss. And it achieves this object by optimizing the spacing between coupled waveguides of a Y-branch splitter at the input or output of multiplexer/demultiplexer 300, but not at both ends. It is also noted that the use of power splitters at input and output ends will increase the overall loss; and such an increase is contrary to a stated object of the '744 patent. The spacing between adjacent channels is illustratively $B_2$, which is about 2.90 nm for the design shown in FIG. 3.

Figure 5:
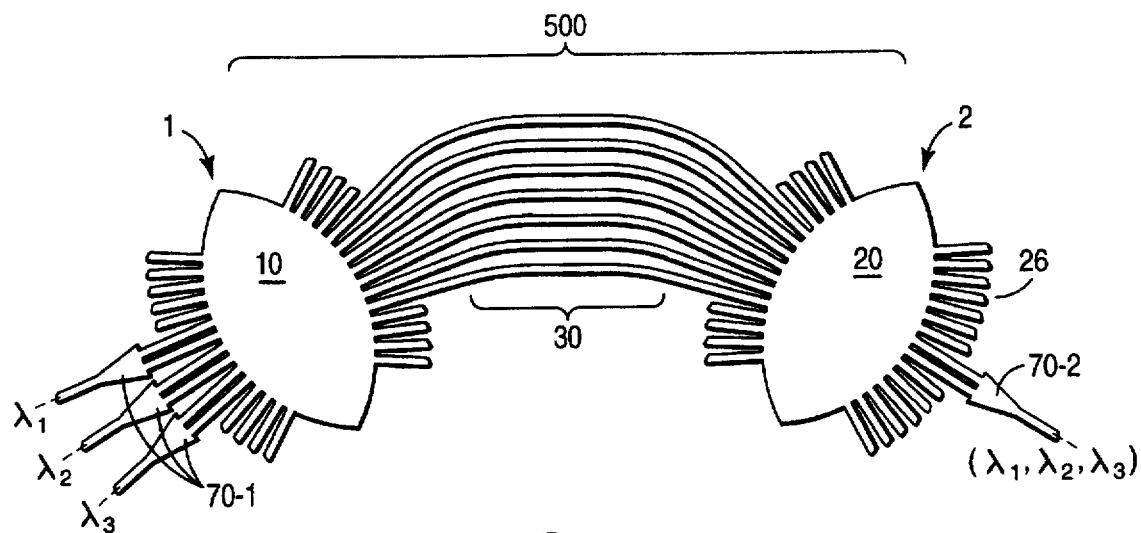
FIG. 5 is an optical multiplexing and demultiplexing apparatus in accordance with the present invention.
Figure 6:
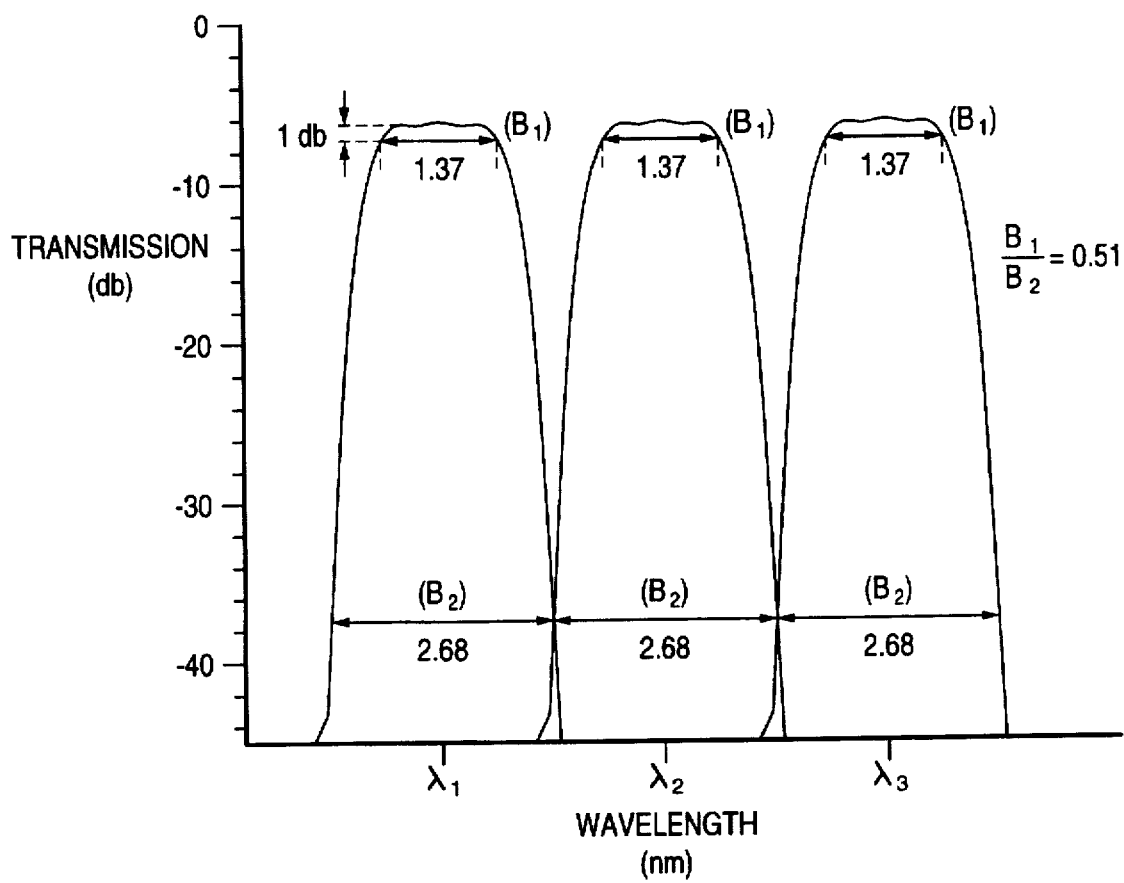
FIG. 6 shows the transmission characteristics for several adjacent channels of the multiplexing and demultiplexing apparatus disclosed in FIG. 5.

Quite surprisingly, it has recently been learned that even wider and flatter passbands can be achieved by using a 1×N power splitter at the input to the first star coupler, and a 1×M power splitter a3 t the output of the second star coupler (where: M,N are integers that are greater than 1). Heretofore, power splitters have only been associated with one star coupler or the other, but not both. FIG. 5 discloses a novel multiplexer/demultiplexer structure 500 in which power splitters 70-1 are used at the input ports of star coupler 1, and power splitter 70-2 is used at the output ports of star coupler 2. Illustratively, all of the power splitters comprise 1×2 branch splitters. Excellent results have also been achieved using 1×2 power splitters at one end and 1×3 power splitters at the other. The improvement provided by this design is demonstrated in FIG. 6 where the associated figure of merit $(B_1/B_2)$ is now equal to 0.51, which represents improvements of 200% and 40% respectively over the prior art designs of FIGS. 1 and 3. The spacing between adjacent channels is illustratively $B_2$, which is about 2.68 nm for the design shown in FIG. 5.

In connection with FIG. 5, the design of star couplers 1 and 2, plus waveguide grating 30, is substantially similar to the DWDM shown in connection with FIG. 1. Moreover, U.S. Pat. No. 5,136,671 is hereby incorporated by reference because it discloses the general design of such DWDMs in greater detail. And while the design of 1×N power splitters is well know to those skilled in the art, a preferred design is discussed below.

Power Splitters

A 1×N power splitter consists of a single waveguide that subdivides into a number (N) of waveguides. Because this structure resembles the branches of a tree, power splitters are sometimes referred to as branch splitters.

Figure 7:
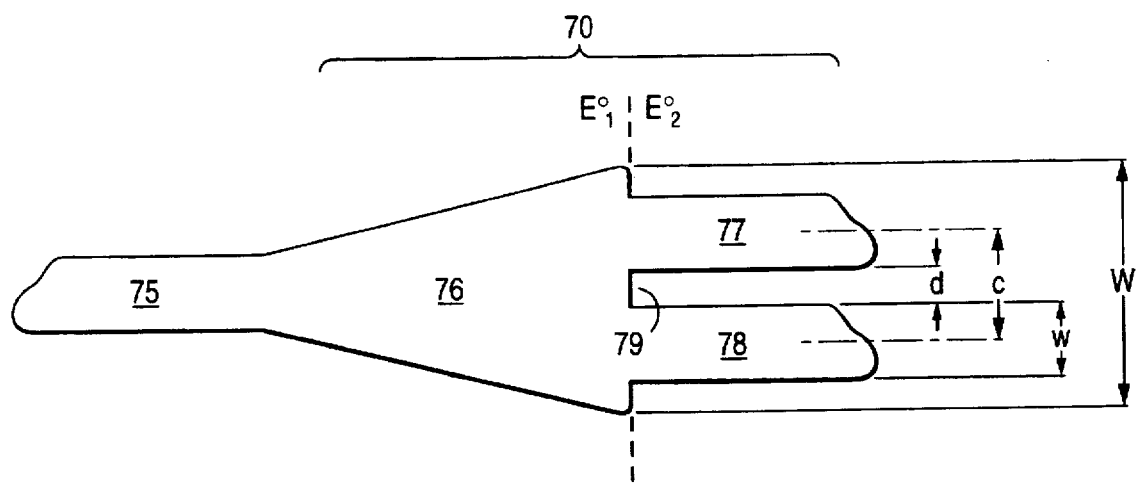
FIG. 7 discloses a preferred design for a Y-branch coupling device.

It has recently been learned that the design of branch splitters can be improved by mode matching of the fundamental modes between the input and output waveguides of a branch splitter. One design of a branch splitter that employs mode matching and is suitable for use in the present invention is shown in FIG. 5 as elements 70-1 and 70-2. Referring now to FIG. 7, branch splitter 70 contains a single input waveguide 75 having an ending width W that is followed by two identical waveguides 77 and 78—each having a width w. The waveguide splitting transition in region 76 is symmetric and adiabatic (i.e., gradually tapered) in order to prevent conversion of the fundamental mode into higher-order asymmetric modes. In addition to the width dimensions of parameters of W and w, a third dimension or parameter d is introduced to represent the width of gap 79 between the pair of waveguides 77 and 78. The gap region 79, whose width is designated d, is at least as large as the reliable repeatable resolution of existing photolithographic techniques (presently about 2 μm). When d=0, the configuration reduces to the ideal Y-junction; however, such a physical configuration cannot be achieved using existing photolithographic techniques. The fundamental mode fields for the single and double waveguide regions are denoted by $E_1^o$ and $E_2^o$ respectively. In principle, excess loss is reduced, for this Y-branch structure, by maximizing the mode match at the junction. In other words, $E_1^o$ is substantially equal to $E_2^o$ at the physical point where the double waveguide region truly begins.

In this regard, the power transmission coefficient through the junction is defined by:

$$P=-10 \log [C_{12}(W, w, d)]^2$$

where $$C_{12}(W, w, d)=\int E_1^o(x, y, W) \cdot E_2^o(x, y, w, d)dx\,dy$$

is the overlap integral. $C_{12}$ can be maximized by adjusting the three layout parameters W, w and d, with the constraint that the value of d be greater than the photolithographic plus waveguide etch resolutions. Field Modes $E_1^o$ (x, y, W) and $E_2^o$ (x, y, w, d) are calculated by a 2-D mode solver.

Illustratively, the calculated power P has a value of about 0.08 dB for a gap size of d=1.5 μm at W=10.0 μm and w=3.0 μm; and about 0.13 dB for a gap size of d=2.01 μm at W=10.5 μm and w=2.5 μm. Greater detail regarding the design of such branch splitters is provided in my co-pending patent application Ser. No. 08/660,245 filed Jun. 7, 1996, which is hereby incorporated by reference.

Figure 8:
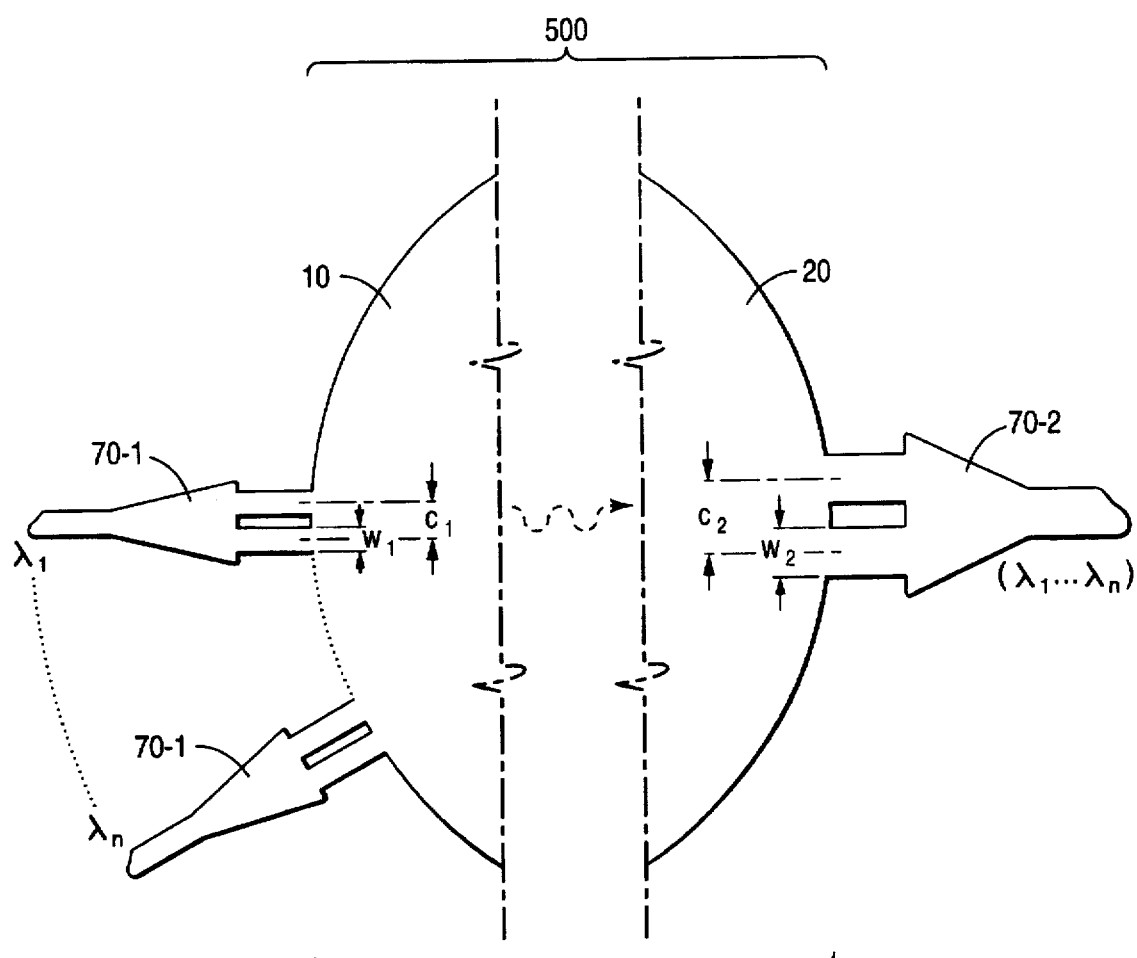
FIG. 8 is a magnified view of certain portions of the optical multiplexing and demultiplexing apparatus shown in FIG. 5.

FIG. 8 provides a magnified view of certain portions of the optical multiplexing and demultiplexing apparatus 500 shown in FIG. 5. Particular attention is drawn to the different dimensions associated with branch splitters 70-1 and 70-2. The transmission characteristic of each channel through device 500 is related to the mathematical convolution of the input and output waveguide mode fields. As shown in FIG. 8, splitter 70-1 includes a pair of waveguides, of width $w_1$, that are separated by distance $c_1$ where they impinge dielectric slab 10; whereas splitter 70-2 includes a pair of waveguides, of width $w_2$, that are separated by distance $c_2$ where they impinge dielectric slab 20.

In one preferred embodiment of the invention, the following dimensions are used: $c_1$=10 μm; $c_2$=20 μm; $w_2$=5 μm; and $w_1$=12 μm. These dimensions are related by the more general relationships: $4c_2>c_1>1.5c_2$, and $4w_2>w_1>1.5w_2$. In this preferred embodiment, wide Y-branches are associated with star coupler 1; whereas narrow Y-branches are associated with star coupler 2. However, because each channel characteristic is the mathematical convolution of the waveguide geometries of the Y-branch splitters (70-1 and 70-2) where they interface dielectric slabs 10 and 20 respectively, and because such convolution is commutative (i.e., ab=ba), it is not surprising that equivalent performance can be achieved if wide Y-branches are associated with star coupler 2 and narrow Y-branches are associated with star coupler 1. And, indeed, this is the case. Accordingly, in another preferred embodiment of the invention, the following dimensions are used: $c_2$=10 μm; $c_1$=20 μm; $w_2$=5 μm; and $w_1$=12 μm. These dimensions are related by the more general relationships:

$$4c_1>c_2>1.5c_1; \text{ and } 4w_1>w_2>1.5w_1.$$

As was indicated earlier, excellent results are achieved with N=3 and M=2. The resulting apparatus would look substantially the same as the apparatus shown in FIG. 5 with the exception that branch splitters 70-1 would each have three output branches instead of two. In this situation, the following dimensions are used:

For the 3-branch devices (corresponds to splitters 70-1 in FIG. 5), the center waveguide has a width that is equal to 12 μm; and the outside waveguides have widths equal to 14 μm. The center-to-center distances are 20 μm. For the 2-branch device (corresponds to splitter 70-2 in FIG. 5), each waveguide has a 5 μm width; and the center-to-center distance between waveguides is 10 μm.

Similarly, excellent results are achieved using the above dimensions for the 2- and 3-branch devices, but with N=2 and M=3. The resulting apparatus would look substantially the same as the apparatus shown in FIG. 5 with the exception that branch splitter 70-2 would now have three output branches instead of two.

Figure 9:
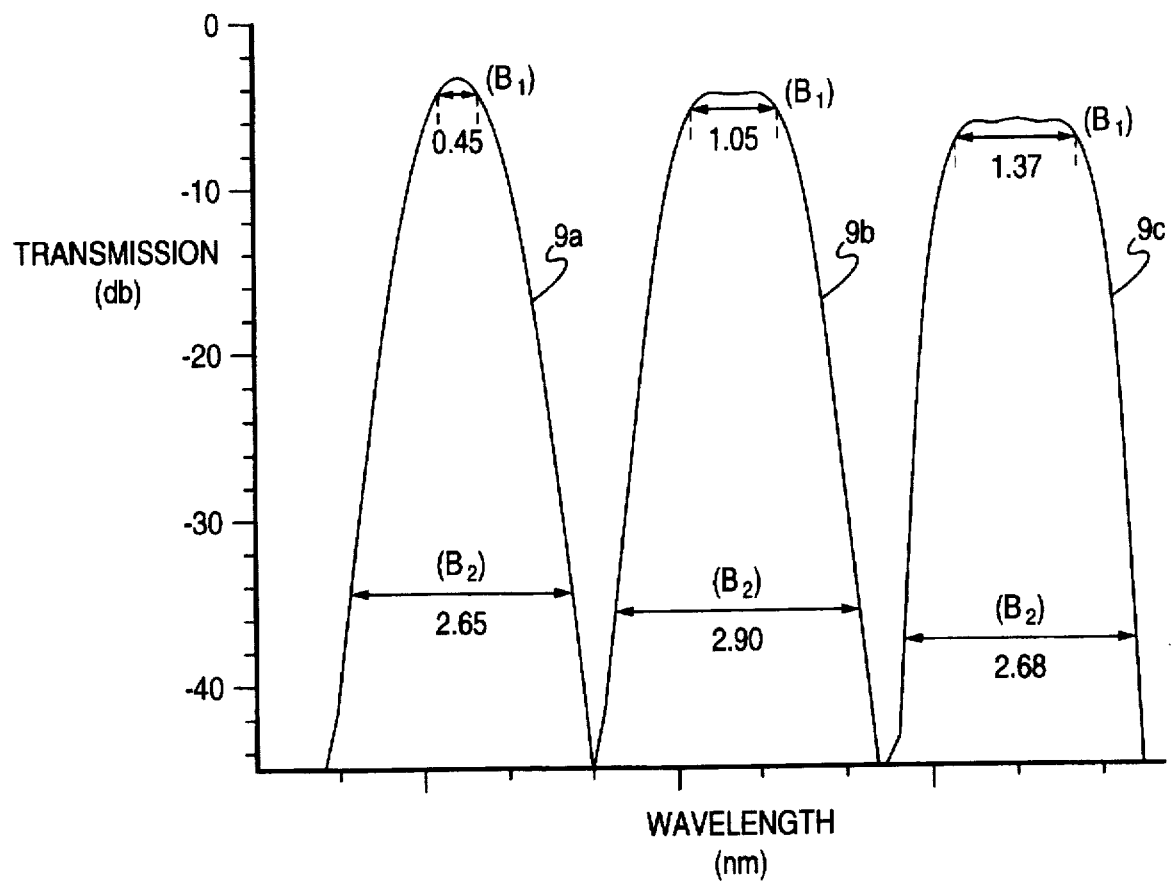
FIG. 9 is a side-by-side comparison of the transmission characteristics of one representative channel of the apparatuses shown in each of FIG. 1, FIG. 3 and FIG. 5.

FIG. 9 provides a side-by-side comparison of the transmission characteristics of one representative channel (9a, 9b and 9c) from each of the apparatuses shown in FIG. 1, FIG. 3 and FIG. 5 respectively. It is noted that wider and flatter passbands appear to be achieved at the expense of intrinsic loss. Nevertheless, known methods of amplification (e.g., Erbium-doped fiber amplifiers) can be used for loss compensation.

Although various particular embodiments of the present invention have been shown and described, modifications are possible within the spirit and scope of the invention. These modifications include, but are not limited to, the use of power splitters other than Y-branch devices and operation at wavelengths other than the 1550 nm region.

We claim:

1. Optical apparatus comprising:

a first power splitter having one input waveguide and N output waveguides connected to a first star coupler, the first star coupler including N input waveguides and a plurality of output waveguides connected to a first free-space region, N being an integer that is greater than one;

a second power splitter having M input waveguides and one output waveguide connected to the output of a second star coupler, the second star coupler including M output waveguides and a plurality of input waveguides connected to a second free-space region, M being an integer that is greater than one; and an optical grating interconnecting the output of the first star coupler to the input of the second star coupler, said optical grating comprising a plurality of unequal-length waveguides.

2. The optical apparatus of claim 1 where N=2 and M=2.

3. The optical apparatus of claim 2 wherein the first and second power splitters comprise Y-branch splitters.

4. The optical apparatus of claim 3 wherein one Y-branch splitter includes a pair of adjacent waveguides whose widths ($w_1$) are approximately equal to each other, and the other Y-branch splitter includes a pair of adjacent waveguides whose widths ($w_2$) are approximately equal to each other, and wherein $w_1 > 1.5 w_2$.

5. The optical apparatus of claim 4 wherein $w_1 < 4 w_2$.

6. The optical apparatus of claim 3 wherein one Y-branch splitter includes a pair of adjacent waveguides that are separated by center-to-center distance ($c_1$), and the other Y-branch splitter includes a pair of adjacent waveguides that are separated by center-to-center distance ($c_2$), and wherein $c_1 > 1.5 c_2$.

7. The optical apparatus of claim 3 wherein each Y-branch splitter comprises:

an input waveguide region having a predetermined width (W) that is capable of transmitting optical energy;

two output waveguide regions positioned to receive at least a portion of the optical energy from the input waveguide region, wherein the output waveguide regions each have predetermined widths (w) and establish a gap of predetermined width (d) between each pair of output waveguides, and wherein $W > 2w + d$.

8. The optical apparatus of claim 1 where N=3 and M=2.

9. The optical apparatus of claim 8 wherein the first and second power splitters comprise branch splitters.

10. The optical apparatus of claim 9 wherein each branch splitter comprises:

an input waveguide region having a predetermined width (W) that is capable of transmitting optical energy;

at least two output waveguide regions positioned to receive at least a portion of the optical energy from the input waveguide region, wherein the output waveguide regions each have predetermined widths (w) and establish a gap of predetermined width (d) between each pair of output waveguides;

and wherein the width of the input waveguide region is greater than the sum of the widths of the output waveguides and respective gap(s).

11. The optical apparatus of claim 1 where N=2 and M=3.

12. The optical apparatus of claim 11 wherein the first and second power splitters comprise branch splitters.

13. The optical apparatus of claim 12 wherein each branch splitter comprises:

an input waveguide region having a predetermined width (W) that is capable of transmitting optical energy;

at least two output waveguide regions positioned to receive at least a portion of the optical energy from the input waveguide region, wherein the output waveguide regions each have predetermined widths (w) and establish a gap of predetermined width (d) between each pair of output waveguides;

and wherein the width of the input waveguide region is greater than the sum of the widths of the output waveguides and respective gap(s).

14. An optical apparatus comprising:

a first power splitter having one input waveguide, and a first plurality (N) of output waveguides connected to a first free-space region, N being an integer which is greater than 1;

a second plurality of waveguides connected to the first free-space region;

an optical grating connected to the second plurality of waveguides comprising a plurality of unequal-length waveguides;

a third plurality of waveguides connected to the optical grating;

a second free-space region connected to the third plurality of waveguides; and a second power splitter having a third plurality (M) of input waveguides connected to the second free-space region, and one output waveguide M being an integer which is greater than 1.

15. The optical apparatus of claim 14 wherein N=2 and M=2.

16. The optical apparatus of claim 14 wherein N=2 and M=3.

17. The optical apparatus of claim 14 wherein N=3 and M=2.

\* \* \* \* \*